US010506566B2

(12) United States Patent
Choi et al.

(10) Patent No.: US 10,506,566 B2
(45) Date of Patent: Dec. 10, 2019

(54) CAUSED BY TRANSMISSION BEAM TRACKING OF UE IN WIRELESS COMMUNICATION SYSTEM AND UE THEREFOR

(71) Applicant: LG Electronics Inc., Seoul (KR)

(72) Inventors: Kukheon Choi, Seoul (KR); Kilbom Lee, Seoul (KR); Kyuseok Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/448,166

(22) Filed: Mar. 2, 2017

(65) Prior Publication Data

US 2018/0254863 A1    Sep. 6, 2018

(51) Int. Cl.
*H04W 72/04*   (2009.01)
*H04L 5/00*   (2006.01)

(52) U.S. Cl.
CPC ......... *H04W 72/0413* (2013.01); *H04L 5/005* (2013.01); *H04L 5/0023* (2013.01); *H04L 5/0073* (2013.01); *H04W 72/042* (2013.01); *H04W 72/046* (2013.01)

(58) Field of Classification Search
None
See application file for complete search history.

(56) References Cited

U.S. PATENT DOCUMENTS

| 9,319,120 | B2 * | 4/2016 | Nagata | H04W 16/28 |
| 2012/0250639 | A1 * | 10/2012 | Tseng | H04L 5/0048 |
| | | | | 370/329 |
| 2012/0315859 | A1 * | 12/2012 | Lee | H04J 11/005 |
| | | | | 455/67.13 |
| 2013/0039203 | A1 * | 2/2013 | Fong | H04B 7/024 |
| | | | | 370/252 |
| 2013/0272263 | A1 * | 10/2013 | Pi | H04W 72/042 |
| | | | | 370/330 |
| 2014/0004898 | A1 * | 1/2014 | Yu | H04W 72/0413 |
| | | | | 455/510 |
| 2015/0009968 | A1 * | 1/2015 | Yu | H04L 5/0053 |
| | | | | 370/336 |
| 2015/0222340 | A1 * | 8/2015 | Nagata | H04W 16/28 |
| | | | | 375/267 |
| 2016/0029323 | A1 * | 1/2016 | Hwang | H04W 52/08 |
| | | | | 370/280 |

(Continued)

*Primary Examiner* — Khaled M Kassim
*Assistant Examiner* — Berhanu D Belete
(74) *Attorney, Agent, or Firm* — Dentons US LLP

(57) ABSTRACT

A method for reducing inter-cell interference caused by transmission (Tx) beam tracking by a user equipment (UE) in a wireless communication system comprises transmitting, to a serving base station (BS), an indicator indicating request for reporting of information about a Tx beam identifier (ID) identifying a Tx beam causing interference to a neighbor cell by transmitting sounding reference symbol (SRS) and information about a cell ID of the neighbor cell; receiving, from the serving BS, control information indicating a position of a resource for transmission of the information about the Tx beam ID and the information about the cell ID of the neighbor cell; and transmitting, to the serving BS, the information about the Tx beam ID and the information about the cell ID of the neighbor cell through the position of resource indicated by the control information.

6 Claims, 11 Drawing Sheets

(56) References Cited

U.S. PATENT DOCUMENTS

| | | | |
|---|---|---|---|
| 2016/0270086 A1* | 9/2016 | Stirling-Gallacher | H04W 72/1226 |
| 2016/0330003 A1* | 11/2016 | Chung | H04L 5/0048 |
| 2017/0142604 A1* | 5/2017 | Reial | H04L 5/0094 |
| 2017/0164377 A1* | 6/2017 | Ho | H04W 16/28 |
| 2017/0207845 A1* | 7/2017 | Moon | H04B 7/088 |
| 2017/0231011 A1* | 8/2017 | Park | H04W 72/0446 |
| 2017/0251460 A1* | 8/2017 | Agiwal | H04W 72/0406 |
| 2017/0273058 A1* | 9/2017 | Agiwal | H04W 16/28 |
| 2018/0076857 A1* | 3/2018 | Jung | H04B 7/0408 |
| 2018/0206132 A1* | 7/2018 | Guo | H04W 16/28 |

\* cited by examiner

CAUSED BY TRANSMISSION BEAM TRACKING OF UE IN WIRELESS COMMUNICATION SYSTEM AND UE THEREFOR

BACKGROUND OF THE INVENTION

Field of the Invention

The present invention relates to wireless communication and, more specifically, to a method for reducing inter-cell interference caused by transmission beam tracking in a wireless communication system and a user equipment (UE) therefor.

Discussion of the Related Art

A beam scanning procedure has a lot of processing overhead and thus bean scanning cannot be performed in an extremely short period. There is a high possibility of faster time variance in channels of 6 GHz or more than in channels of 6 GHz or less due to the aforementioned additional channel elements. In addition, a BS beam configuration may be fixed in the cellular system but a UE beam may change according to the position of a serving cell, a surrounding environment variation, a UE behavior pattern and the like. That is, there is a high possibility of generation of Tx/Rx beam mismatch in beam scanning periods. To overcome this, accordingly, a beam tracking technique is required.

SUMMARY OF THE INVENTION

An object of the present invention is to provide a method for reducing inter-cell interference caused by transmission (Tx) beam tracking by a UE in a wireless communication system.

Another object of the present invention is to provide a UE for reducing inter-cell interference caused by Tx beam tracking thereof in a wireless communication system.

The technical problems solved by the present invention are not limited to the above technical problems and those skilled in the art may understand other technical problems from the following description.

To accomplish the object of the present invention, there is provided a method for reducing inter-cell interference caused by transmission (Tx) beam tracking by a UE in a wireless communication system, including: transmitting, to a serving BS, an indicator indicating request for reporting of information about a Tx beam identifier (ID) identifying a Tx beam causing interference to a neighbor cell by transmitting sounding reference symbol (SRS) and information about a cell ID of the neighbor cell; receiving, from the serving BS, control information indicating a position of a resource for transmission of the information about the Tx beam ID and the information about the cell ID of the neighbor cell; and transmitting, to the serving BS, the information about the Tx beam ID and the information about the cell ID of the neighbor cell through the position of resource indicated by the control information.

The method may further include transmitting a SRS in a beam direction corresponding to a Tx beam ID other than the transmitted Tx beam ID when SRS transmission is triggered.

The information about the Tx beam ID may include information about a Tx beam ID identifying a Tx beam causing the biggest interference to the neighbor cell. The information about the Tx beam ID may further include information about a Tx beam ID identifying a Tx beam causing interference to the neighbor cell in addition to the information about the Tx beam ID identifying the Tx beam causing the biggest interference to the neighbor cell.

The information about the Tx beam ID identifying the Tx beam causing the biggest interference to the neighbor cell and the information about the cell ID of the neighbor cell may be transmitted on a corresponding resource of an uplink control channel indicated by the control information. The information about the Tx beam ID identifying the Tx beam causing interference to the neighbor cell and the information about the cell ID of the neighbor cell may be transmitted through an uplink data channel indicated by the control information.

The information about the Tx beam ID identifying the Tx beam causing interference to the neighbor cell and the information about the cell ID of neighbor cell may be piggybacked on data of the uplink data channel and transmitted.

The indicator may be included and transmitted in an uplink control channel, and a scheduling request (SR), an ACK/NACK signal or channel state information may be further included and transmitted in the uplink control channel.

To accomplish the other object of the present invention, there is provided a user equipment (UE) for reducing inter-cell interference caused by Tx beam tracking in a wireless communication system, including: a transmitter; a receiver; and a processor, wherein the processor is configured to control the transmitter to transmit, to a serving BS, an indicator indicating request for reporting of information about a Tx beam ID identifying a Tx beam causing interference to a neighbor cell by transmitting SRS transmission and information about a cell ID of the neighbor cell, to control the receiver to receive, from the serving BS, control information indicating a position of a resource for transmission of the information about the Tx beam ID and the information about the cell ID of the neighbor cell and to control the transmitter to transmit, to the serving BS, the information about the Tx beam ID and the information about the cell ID of the neighbor cell through the position of resource indicated by the control information.

The processor may control the transmitter to transmit an SRS in a beam direction corresponding to a Tx beam ID other than the transmitted Tx beam ID when SRS transmission is triggered.

The information about the Tx beam ID may include information about a Tx beam ID identifying a Tx beam causing the biggest interference to the neighbor cell. The information about the Tx beam ID may further include information about a Tx beam ID identifying a Tx beam causing interference to the neighbor cell in addition to the information about the Tx beam ID identifying the Tx beam causing the biggest interference to the neighbor cell.

The processor may be further configured to control the transmitter to transmit the information about the Tx beam ID identifying the Tx beam causing the biggest interference to the neighbor cell and the information about the cell ID of the neighbor cell on a corresponding resource of an uplink control channel indicated by the control information. The processor may be further configured to control the transmitter to transmit the information about the Tx beam ID identifying the Tx beam causing interference to the neighbor cell and the information about the cell ID of the neighbor cell through an uplink data channel indicated by the control information. The processor may be further configured to control the transmitter to piggyback and transmit the information about the Tx beam ID identifying the Tx beam causing interference to the neighbor cell and the information about the cell ID of the neighbor cell on data of the uplink data channel. The processor may be further configured to control the transmitter to include the indicator on an uplink control channel and transmit, wherein the processor may be further configured to control the transmitter to further include an SR, an ACK/NACK signal or channel state information on the uplink control channel and transmit.

A serving cell and a neighbor cell may perform UL scheduling in an integrated manner according to an embodiment of the present invention to reduce inter-cell interference due to SRS transmission for beam tracking of a UE.

The effects that can be obtained by the present invention are not limited to the aforementioned effects and those skilled in the art may understand other effects from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
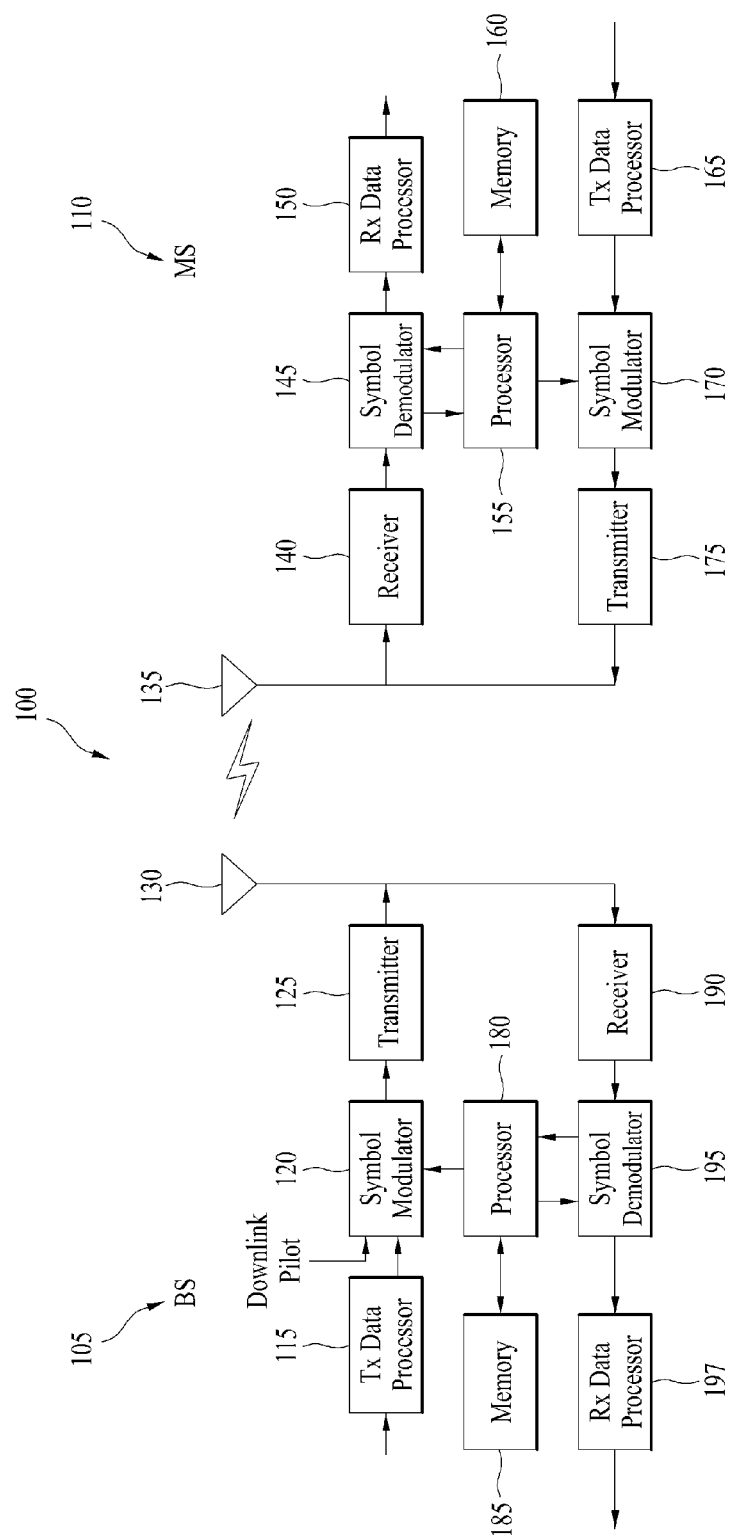
FIG. 1 is a block diagram illustrating configurations of a BS 105 and a UE 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system, 3GPP LTE-A, or 5G system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For Tx beam tracking of a UE, the UE needs to transmit an SRS according to each candidate UE Tx beam. Since SRS transmission in a lot of beam directions (an omnidirectional Tx beam set of the UE) causes loss of lots of resources, the present invention proposes a method for performing adaptive UE Tx beam tracking by flexibly transmitting an SRS depending on a UE variation pattern.

First of all, SRS transmission in a 3GPP LTE/LTE-A system will be described in the following table 1.

TABLE 1

A UE shall transmit Sounding Reference Symbol (SRS) on per serving cell SRS resources based on two trigger types:
trigger type 0: higher layer signaling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\overline{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$ and SRS subframe offset $T_{offset,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{CS}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signaling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signaling. For trigger type 1 and DCI formats 1A/2B/2C/2D, a single common set of SRS parameters, srs-ConfigApDCI-Format1a2b2c, is configured by higher layer signaling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signaling.

The following table 2 shows SRS request values for trigger type 1 in DCI format 4 in the 3GPP LTE/LTE-A system.

TABLE 2

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

The following table 3 shows additional description related to SRS transmission in the 3GPP LTE/LTE-A system.

TABLE 3

The serving cell specific SRS transmission bandwidths $C_{SRS}$ are configured by higher layers.
The allowable values are given in subclause 5.5.3.2 of [3].

TABLE 3-continued

The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \mod 2 & \text{when K is even} \\ n_{SRS} \mod 2 & \text{when K is odd} \end{cases},$$

$$\beta = \begin{cases} 1 & \text{where K mod 4 = 0} \\ 0 & \text{otherwise} \end{cases}$$

when frequency hopping is enabled (i.e., $b_{hop} < B_{SRS}$), where values $B_{SRS}$, $b_{hop}$, $N_b$, and $n_{SRS}$ are given in subclause 5.5.3.2 of [3], and $$K = \prod_{b'=b_{hop}}^{B_{SRS}} N_{b'} \left(\text{where } N_{b_{hop}} = 1 \text{ regardless of the } N_b \text{ value}\right),$$

except when a single SRS transmission is configured for the UE.
If a UE is configured with more than one serving cell, the UE is not expected to transmit SRS on different antenna ports simultaneously.
A UE may be configured to transmit SRS on $N_p$ antenna ports of a serving cell where $N_p$ may be configured by higher layer signaling.
For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever TABLE 3-continued SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes. For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$, where for FDD $k_{SRS} = \{0, 1, \ldots, 9\}$ is the subframe index within the frame, for TDD serving cell $k_{SRS}$ is defined in Table 8.2-3. The SRS transmission instances for TDD serving cell with $T_{SRS} = 2$ are the subframes satisfying $(k_{SRS} - T_{offset}) \bmod 5 = 0$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying $n + k$, $k \geq 4$ and $(10 \cdot n_f + k_{SRS} - T_{offset,1}) \bmod T_{SRS,1} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signaling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

The following table 4 shows a subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

The following table 5 shows a subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | 1 | | | | | | 6 | | | |
| | 1st symbol of UpPTS | 2nd symbol of UpPTS | | | | | 1st symbol of UpPTS | 2nd symbol of UpPTS | | |
| 0 | | | 2 | 3 | 4 | 5 | | | 7 | 8 | 9 |
| $k_{SRS}$ in case UpPTS length of 2 symbols | 0 | 1 | 2 | 3 | 4 | | 5 | 6 | 7 | 8 | 9 |
| $k_{SRS}$ in case UpPTS length of 1 symbol | 1 | | 2 | 3 | 4 | | 6 | | 7 | 8 | 9 |

Table 8 shows a subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | Reserved | reserved |

Table 9 shows a subframe offset configuration ($T_{offset, 1}$) and UE-specific SRS periodicity ($T_{SRS, 1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |

TABLE 9-continued

| SRS Configuration Index $I_{SRS}$ | SRS Periodicity (ms) | SRS Subframe Offset |
|---|---|---|
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Table 10 shows additional channel variation properties (blockage effect) of a channel of 60 GHz or higher in comparison with channels of 60 GHz or lower.

TABLE 10

| Ref. | Test description | Tx height | Rx height | Test frequency | Blockage rate relative parameter |
|---|---|---|---|---|---|
| [2] | One blocker moving (1 m/s) Horn(22.4 dBi, 12°) Patch(4.3 dBi/2.2 dBi, 58°) 4 blockers moving | 2.2/1.2 m | 1.2 m | 60 GHz | [1]Series of Blockage event duration(threshold 5 dB) 780~1839 ms(Horn) 640~1539 ms(Patch) Series of Blockage event duration(threshold 5 dB) 688 ms(Horn, average) 278 ms(Patch, average) |
| [5] | 1~15 blockers moving The horns(22.4 dBi, 12° in azimuth, about 10° in elevation) The patches (about 3 dBi, 60° both in elevation and azimuth. The vertical polarization) | 1.58/2.77 m | 1.55 m | 60 GHz | Series of Blockage event duration (Threshold 10 dB)    (Threshold 20 dB) 300 ms(1~5 persons)   100 ms(1~5 persons) 350 ms(6~10 persons)  150 ms(6~10 persons) 450 ms(11~15 persons) 300 ms(11~15 persons) |
| [6] | — | — | — | 60 GHz | 93 ms(Mean Drop Rate) |
| [7] | One blocker moving(Walking speed) 20 dBi, 10° | 1.1 m | 0.75 m | 67 GHz | $t_D$ = 230 ms (average, Threshold 20 dB) |
| [8] | One blocker moving(Walking speed) 20 dBi, 10° | 1.1 m | 0.75 m | 67 GHz | $t_D$ = 370 ms~820 ms $t_{decay}$ = 230 ms(mean), 92 ms(s.d.)(Threshold 20 dB) $t_{rising}$ = 220 ms(mean),100 ms(s.d.)(Threshold 20 dB) |

Figure 2A:
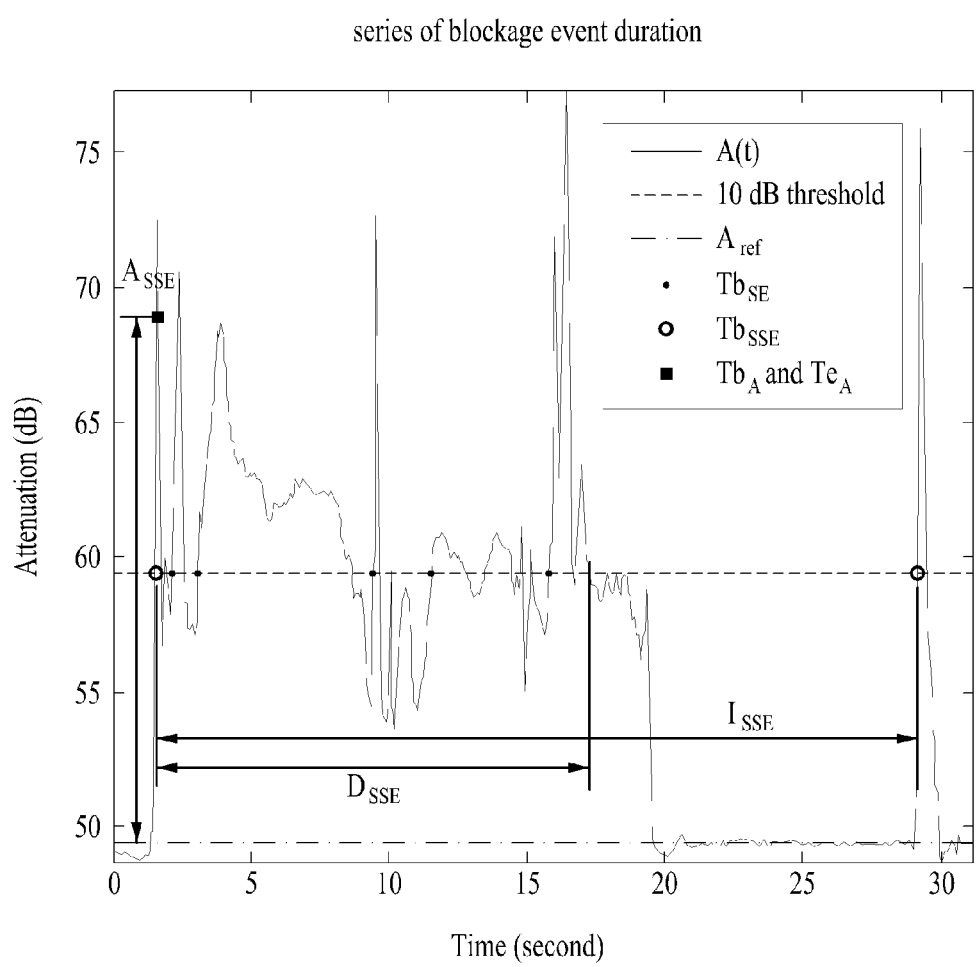
FIG. 2a illustrates series of blockage event duration in Table 10 and FIG. 2b illustrates blockage duration ($t_D$) in Table 10.
Figure 2B:
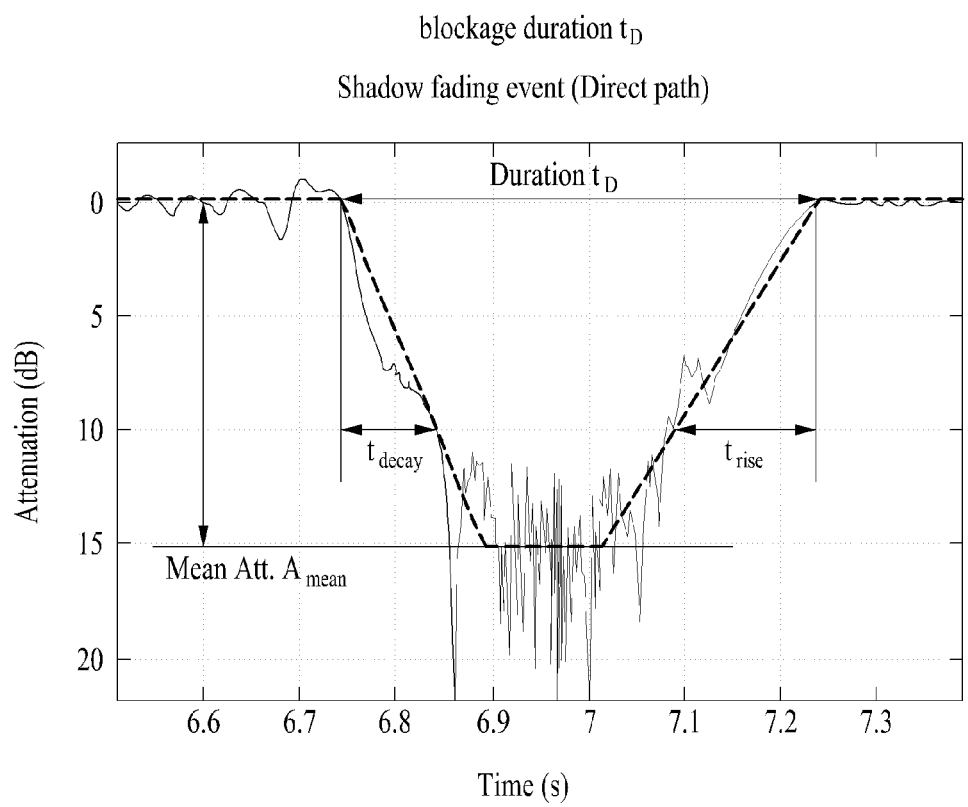

FIG. 2 illustrates a blockage duration in relation with Table 10. In FIG. 2a, series of blockage event duration in Table 10 shows time at which significant blockage is generated. FIG. 2b illustrates blockage duration ($t_D$) in Table 2. Series of blockage events indicate time at which significant blockage is generated and $t_D$ indicates a time taken to return to a normal state after blockage.

Table 11 shows a pattern relation between $t_{decay}$ and $t_{rising}$ and a UE.

TABLE 11

| | Walking (0.6 m/s) [7] | Sprinting (10 m/s) [9] | Swift Hand swing (43 m/s) |
|---|---|---|---|
| $t_{decay}$, $t_{rising}$ (ms) | 150 ms (measure) | 9 ms (calculation) | 2.093 ms (calculation) |

While a blockage variation averages 100 ms (walking obstacle speed (4 km/h)) in Table 11, this can be changed in the range of 2 to hundreds of ms according to UE pattern and surrounding environment.

For Tx beam tracking, a UE needs to transmit an SRS depending on each candidate UE Tx beam. As the number of UE candidate Tx beams increases, the number of SRS symbols increases due to repeated SRS transmission for beam tracking and thus different frame structures are configured in a serving cell (or serving BS) and neighbor cells (or neighbor BSs). Particularly, an SRS channel applies extreme interference to other cells during UE Tx beam tracking on uplink. The present invention proposes a method for reducing interference between an SRS and other uplink channels by previously detecting and removing UE Tx candidate beam IDs that may cause big (or severe) interference during UE Tx tracking.

Necessity of Beam Tracking

Figure 3:
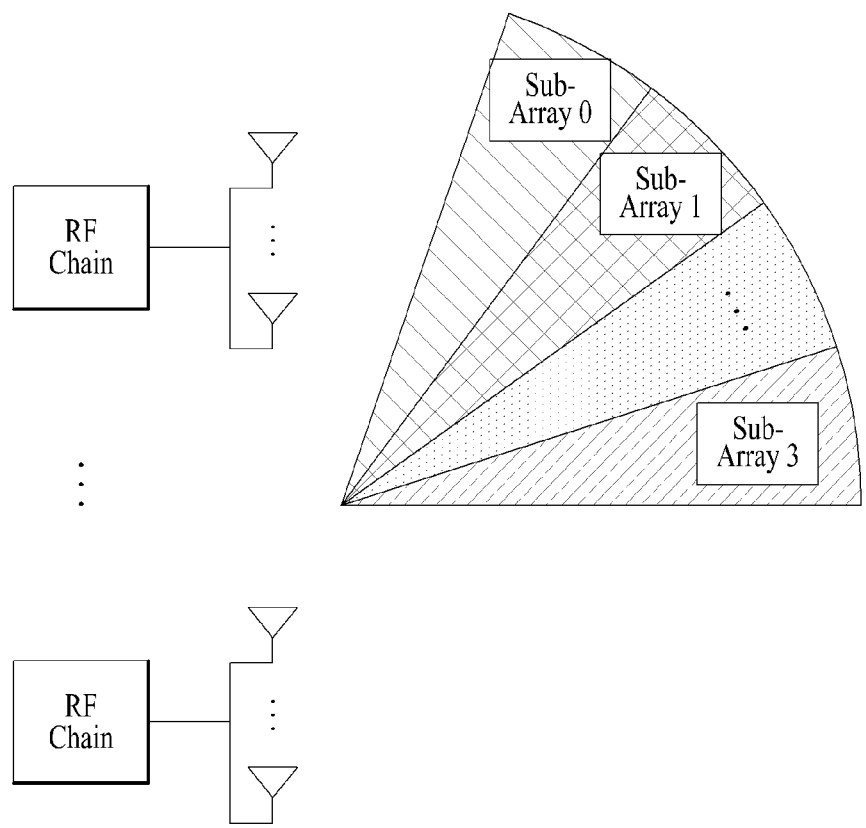
FIG. 3 illustrates a wide beam using 4 narrow beams.

When a multi-beam is appropriately positioned, a wide beam can be defined as illustrated in FIG. 3.

FIG. 3 illustrates a wide beam using 4 narrow beams.

Referring to FIG. 3, the wide beam is defined using 4 sub-arrays. In the present invention, it is assumed that a transmitter transmits a synchronization signal using the wide beam. That is, it is assumed that all sub-arrays carry the same PSS (Primary Synchronization Signal)/SSS (Secondary Synchronization Signal)/PBCH(Physical Broadcast Channel).

When a plurality of beams is defined to cover a wide area, a beam gain decreases. To offset this, a power gain may be additionally provided through repeated transmission in the time domain. A synchronization subframe based on such repeated transmission is illustrated in FIG. 4.

Figure 4:
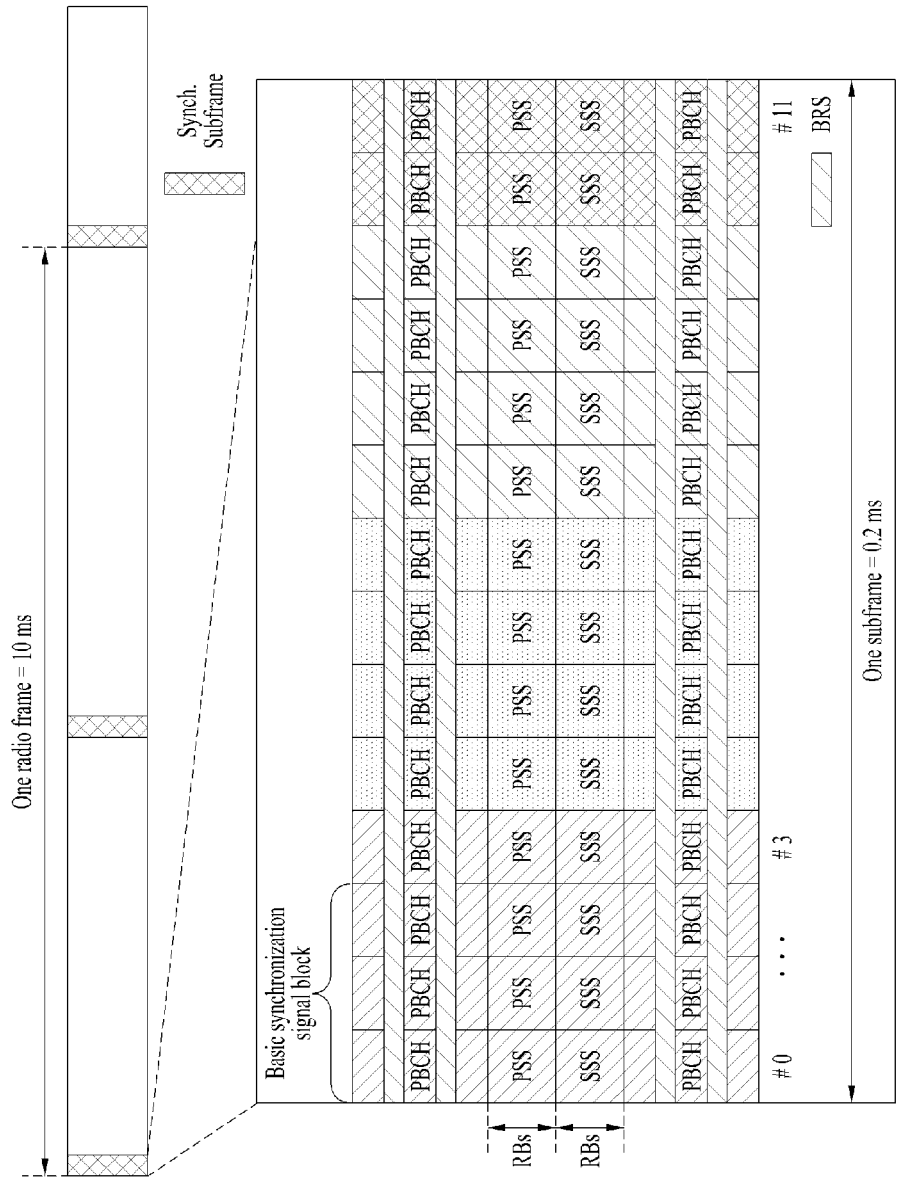
FIG. 4 illustrates an example of a structure of a synchronization subframe.

FIG. 4 illustrates an example of a structure of the synchronization subframe.

FIG. 4 shows the synchronization subframe structure and defines a PSS/SSS/PBCH. In FIG. 4, blocks in the same hatched pattern refer to an OFDM (Orthogonal Frequency Division Multiplexing) symbol group to which the same RF beam group (defined using 4 sub-array beams) is applied. That is, 4 OFDM symbols use the same multi-RF beam. A beam scanning period may be configured in a normal form in new RAT with reference to the structure of FIG. 4, as illustrated in FIG. 5.

Figure 5:
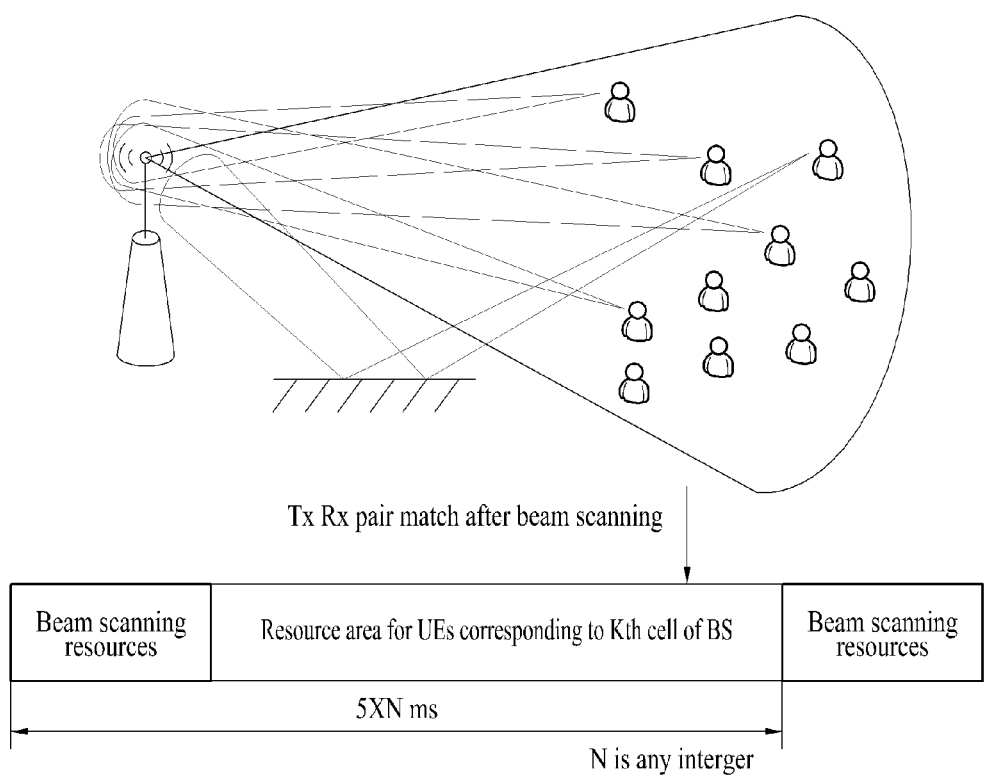
FIG. 5 illustrates a beam scanning period and a resource area (e.g., a period of 5×N)

FIG. 5 illustrates a beam scanning period and a resource area (e.g., a period of 5×N ms).

A beam scanning procedure basically has a lot of processing overhead and thus beam scanning cannot be performed in an extremely short period. Further, there is a high possibility of faster time variance in channels of 6 GHz or more than in channels of 6 GHz or less due to the aforementioned additional channel elements. In addition, a BS beam configuration may be fixed in the cellular system but a UE beam may change according to the position of a serving cell, surrounding environment variation, a UE behavior pattern and the like. That is, there is a high possibility of generation of Tx/Rx beam mismatch in beam scanning periods. To overcome this, accordingly, a beam tracking technique is required.

In general, there is a high possibility of establishment of beam pair reciprocity (which means that a pair of a best BS Tx beam and a UE Rx beam equals a pair of a best UE Tx beam and a BS Rx beam) in comparison with channel reciprocity.

However, beam pair reciprocity may not be established in the following cases. 1) When different criteria of selection of a beam pair are set for uplink and downlink intentionally, for example, when a downlink beam pair is set according to a criterion of maximizing Rx power and an uplink beam pair is set according to a criterion of minimizing interference, beam pair reciprocity may not be established. 2) When a BS TX antenna position and Rx antenna position differ from each other or a UE Tx antenna position and Rx antenna position differ from each other, for example, when downlink is connected to a macro cell and uplink is connected to a pico cell in Hetnet, beam pair reciprocity may not be established. Except in these limited exceptional cases, a beam pair can be estimated using beam pair reciprocity.

Beam tracking may be performed by applying a UE Rx beam to each beam measurement reference signal (BRS) and measuring RSRP (receiver signal received power) at that time using the BRS illustrated in FIG. 5 in the case of downlink. When Tx/Rx beam pair reciprocity (i.e., a BS Tx beam/UE Rx beam pair and a UE Tx beam/BS Rx beam) for downlink is established, a Tx/Rx beam pair obtained by the BRS can be applied to uplink. In other cases, the SRS and the like may be used on uplink. When surest uplink beam tracking is required, SRSs corresponding to all Tx beam IDs of a UE need to be transmitted. This means that a PUSCH (Physical Uplink Shared Channel) transmission period is reduced according to SRS transmission and deteriorates uplink throughput performance.

When periodic SRS transmission is considered for beam tracking for a UE Tx beam/BS Rx beam pair, a higher layer can set the number of transmitted SRSs for fixed UE Tx candidate beams in a fixed manner (e.g., a BS can indicate the number of transmitted SRSs of fixed UE Tx candidate beams through high layer signaling (RRC signaling))

However, when aperiodic SRS transmission is considered, an additional SRS transmission region is required with respect to added UE Tx candidate beams, and SRS transmission setting for aperiodic beam tracking is triggered by a UE or a BS and thus may be different in respective beam tracking subframes.

Figure 6:
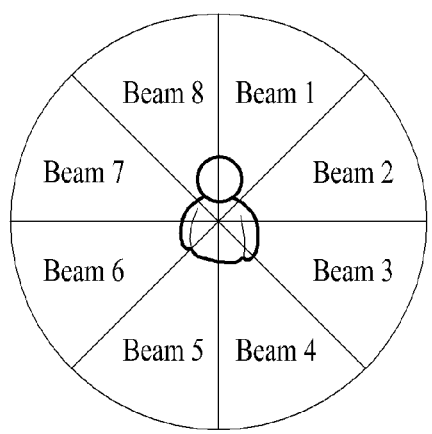
FIG. 6 illustrates inter-cell interference during Tx beam tracking of a UE.
Figure 7:
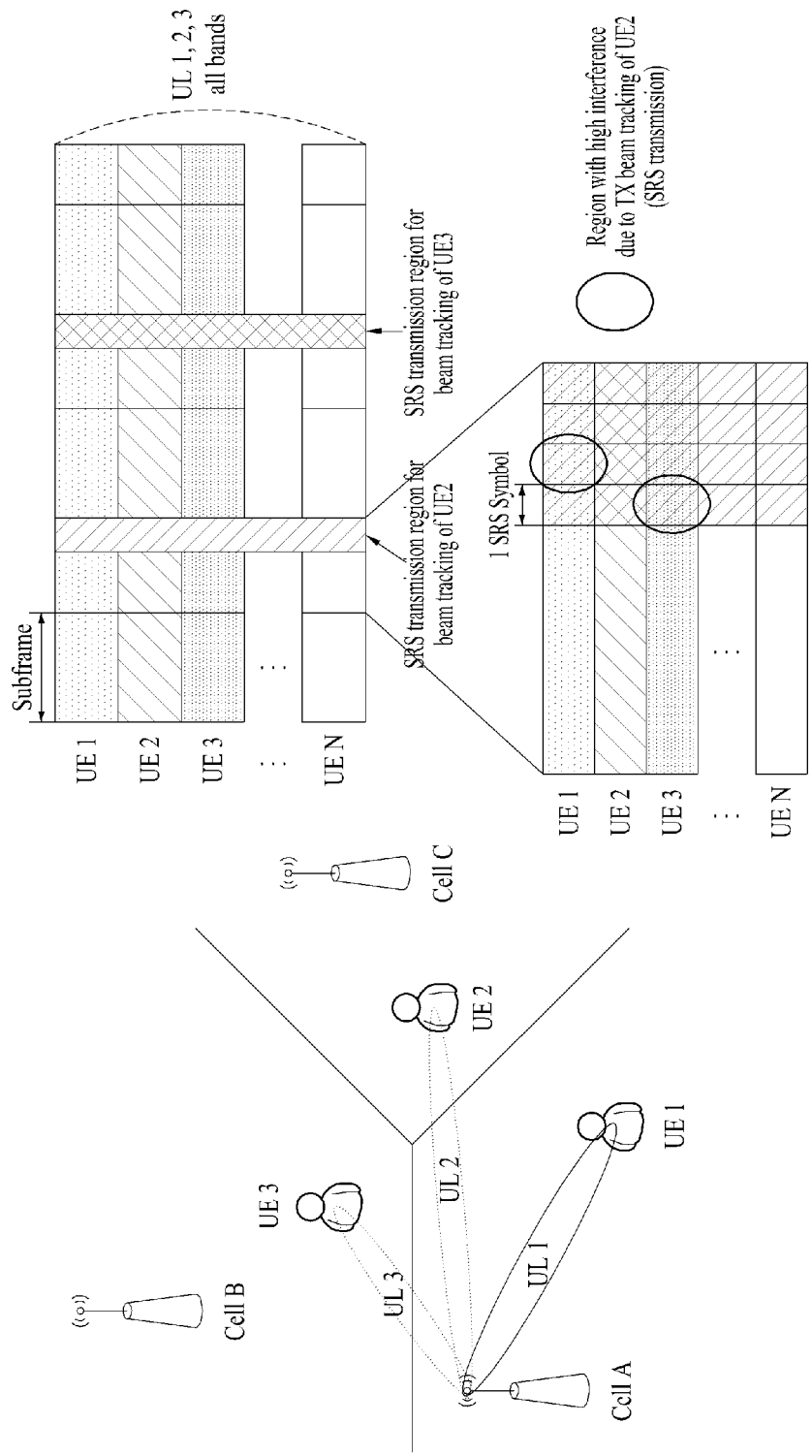
FIG. 7 illustrates SRS transmission and interference during beam tracking of UE 2 of FIG. 6.

FIG. 6 illustrates inter-cell interference during UE Tx beam tracking and FIG. 7 illustrates SRS transmission and interference during beam tracking of UE 2 of FIG. 6.

As illustrated in FIG. 6, when uplink beam tracking is triggered and performed, uplink candidate beams carry an SRS having beam IDs that cause big interference to other cells (SRS is transmitted through all bands in a beamformed state in general). Accordingly, if an uplink control channel (e.g., xPUCCH) or an uplink data channel (e.g., xPUSCH) is transmitted on uplink of a cell to which the interference is applied at the timing of uplink beam tracking, the SRS causes big inter-cell interference in the corresponding uplink channel, as illustrated in FIG. 7, deteriorating reception performance In FIG. 7, xPUSCH (k, 1) resources of UE 1 received from a serving BS can be represented as Equation 1. Here, it is assumed that a channel is AWGN.

$$\tilde{z}_{k,l}^{(p),pusch\_UE1} = z_{k,l}^{(p),pusch\_UE1} + \alpha_{k,l}^{(p),SRS\_UE2} + n \quad \text{[Equation 1]}$$

$\alpha_{k,l}^{(p),SRS\_UE2}+n$: SRS(k,1)interference resource of UE2 corresponding to port p in FIG. 6

$Z_{k,l}^{(p),pusch\ UE1}$: xPUSCH(k,1)resource of UE1 corresponding to port p in FIG. 6

Referring to FIG. 7, while the SRS for beam tracking of UE 2 can be transmitted in a corresponding symbol through all bands, if UE 1 or UE 3 transmits an uplink control channel or an uplink data channel through the corresponding symbol, interference due to SRS of UE 2 increases in the corresponding symbol.

For UE Tx beam tracking, a UE needs to transmit the SRS depending on each candidate Tx beam. As the number of candidate Tx beams of the UE increases, the number of SRS symbols increases due to repeated SRS transmission for beam tracking. Accordingly, different frame structures may be configured in a serving cell and neighbor cells. Particularly, an SRS channel causes big interference to other cells during UE Tx beam tracking on uplink.

The present invention proposes a method through which a UE previously detects candidate Tx beam IDs that may cause big interference and reports, to a serving cell, information about the candidate Tx beam IDs and information about corresponding neighbor cell IDs (neighbor cell IDs corresponding to the candidate Tx beam IDs) during SR transmission or through transmission of a new physical uplink control channel (e.g., xPUCCH hereinafter). According to the proposed method, the serving cell can perform UL scheduling with neighbor cells in an integrated manner, reducing inter-cell interference.

Prior to a description of the present invention, assumption applied to the present invention will be described. The present invention assumes that each UE is previously aware of neighbor cell IDs and Tx beam IDs that cause interference to other cells during SRS transmission through neighbor cell search around the serving cell.

Downlink Beam Search Method

It may be assumed that a downlink beam search method (irrespective of a search target, i.e., best TRP beam/UE Rx beam) using a downlink RS transmitted for searching for a BRS or a beam is performed.

The downlink beam search setting requires assumption that a UE has a serving cell and neighbor cell ID in a network configured by prepared cells including a serving cell.

In the above method, it may be assumed that a TRP Tx beam and a UE Rx beam corresponding thereto are paired in a serving cell and that the neighbor cell ID to which high interference is applied via overhearing (during this operation, signals are detected as the UE Rx beam is swept) and information on the TRP Tx beam of the neighbor cell and the UE Rx beam corresponding thereto are acquired. As a method of permitting a UE to have the neighbor cell ID and the UE Rx beam ID, during downlink beam search, a sequence indicating each TRP beam ID may be transmitted by a prepared cell and the ID may be detected via beam sweeping of the UE.

When a power value in the TRP Tx/UE Rx pair in any neighbor cell is greater than a specific threshold a, the UE may have the pair information.

Assumption that Beam Reciprocity Needs to be Satisfied

A UE may perform uplink transmission using an uplink data resource and an SRS resource corresponding to TRP Tx/UE Rx beam with a serving cell and have TRP Tx/UE Rx beam ID in neighbor cells via the downlink beam search method. Accordingly, according to beam reciprocity, the UE Rx beam ID may be the UE Tx beam ID.

For example, a method of detecting a neighbor cell ID may include a method using a BRS.

Figure 8:
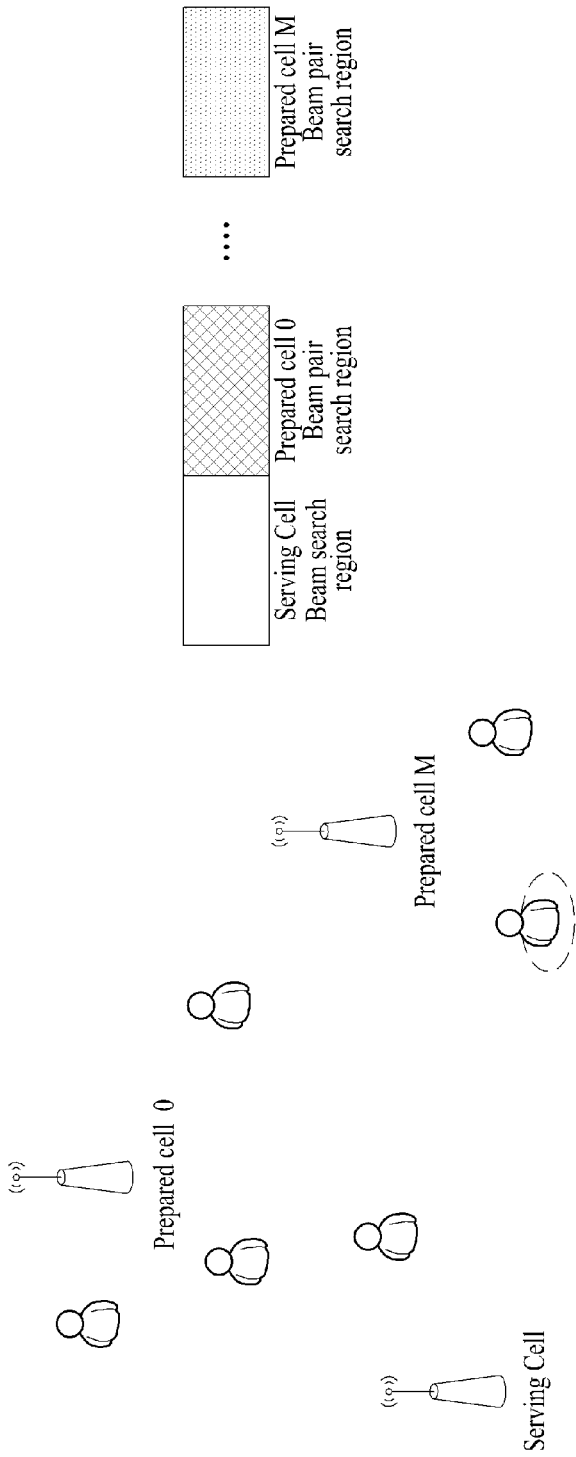
FIG. 8 is a diagram illustrating an example of setting of a beam pair search procedure.

FIG. 8 is a diagram illustrating an example of setting for a beam pair search procedure.

As illustrated in FIG. 8, beam search start points of prepared cells including a serving cell may be separately set. Beam search related information may include beam search start points (e.g., subframe index, symbol index, or frame index) and beam search procedure information. UEs that are RRC-connected to prepared cells including a serving cell know a beam search procedure of each cell and, thus, when the serving cell performs beam search, the UEs may detect a BRS sequence that strongly interfere in the corresponding UE via overhearing (during overhearing, a resource is not allocated by a serving BS of the corresponding UE). When a unit for identifying beam search is a slot unit, a slot from which strongest RSRP is acquired may be recognized from an exemplary scrambling formula according to Equation 2 below and a prepared cell from which BRS is transmitted may be implicitly detected. The above condition requires the assumption that a serving cell pre-knows a set of prepared cells. Accordingly, IDs ($N_{ID}^{prepared\_cell}$) of prepared cells that interfere in the set of the prepared cells may be detected.

$$C_{init}=2^{10}(7(n_s+1)+l+1)+1 \quad \text{[Equation 2]}$$

(When a PN sequence is used, each slot includes 7 symbols and $n_s$ is a slot index.)

Embodiment 1

An indicator (e.g., a flag) indicating reporting of information about a UE Tx beam ID that causes big interference to uplink of a neighbor cell due to SRS transmission and information about a related neighbor cell ID to a serving cell (or serving BS) may be transmitted (through an xPUCCH). When the flag is enabled, the UE can report, to the serving cell, the information about the UE Tx beam ID that causes big interference to uplink of a neighbor cell and information about the neighbor cell ID corresponding to the UE Tx beam ID. Accordingly, the serving cell can instruct the UE not to transmit an SRS corresponding to the reported Tx beam ID.

When the flag is used, the UE can transmit the UE Tx beam ID that causes big interference to a neighbor cell and a neighbor cell ID corresponding thereto through the xPUCCH or a physical uplink shared channel (referred to as xPUSCH hereinafter) only when the UE desires, reducing uplink resource overhead. In addition, there is no need to increase the number of xPUCCH formats. If the UE needs to report a plurality of neighbor cell IDs, the xPUCCH format needs to include information about a plurality of neighbor cells and thus the number of UCI bits that need to be transmitted may vary.

Table 12 shows a new xPUCCH format for reporting a UE Tx beam ID that causes big interference to a neighbor cell during SRS transmission and the related neighbor cell ID.

TABLE 12

| xPUCCH format | SR | Flag for request of reporting of UE Tx beam ID causing interference during SRS transmission and related neighbor cell ID. |
|---|---|---|
| xPUCCH format X | ON | 0 |
|  | ON | 1 |

Referring to Table 12, the UE can transmit an SR and an xPUCCH including a 1-bit flag. Here, the 1-bit flag indicates whether a Tx beam ID causing big interference to a neighbor cell during SRS transmission and a related neighbor cell ID is reported (or a reporting request).

Specific Example (Embodiment 1-1) of Embodiment 1

When the 1-bit flag is enabled (e.g., when the flag is set to "1"), the serving BS may indicate the position of an xPUCCH resource or an xPUSCH resource through which information about a UE Tx beam ID causing interference to a neighbor cell and a neighbor cell ID related to the Tx beam ID will be transmitted by transmitting downlink control information (DCI) to the UE. When the information is transmitted through the xPUSCH resource, the information may be piggybacked on data and transmitted as piggybacking UCI.

Figure 9:
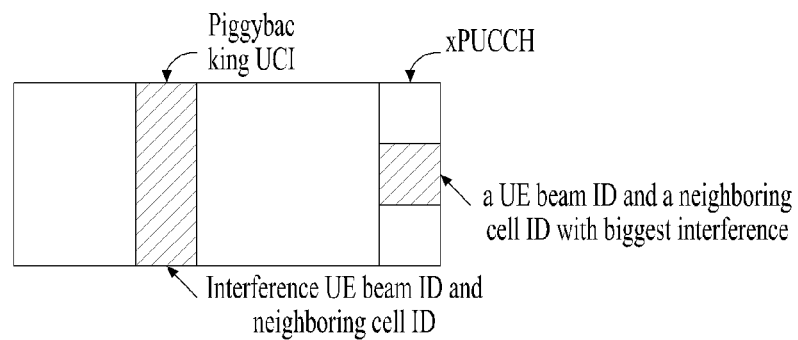
FIG. 9 illustrates transmission positions of information about a Tx beam ID that cause inter-cell interference and a related neighbor cell ID.

FIG. 9 illustrates transmission positions of information about a Tx beam ID causing inter-cell interference and a related neighbor cell ID.

Referring to FIG. 9, the serving BS may allocate information about a Tx beam ID that causes the biggest interference to a neighbor cell and a neighbor cell ID corresponding thereto to an xPUCCH resource such that the information will be transmitted through the xPUCCH resource and allocate information about the remaining Tx beam IDs causing interference and neighbor cell IDs corresponding thereto to an xPUSCH such that the information will be piggybacked and transmitted on the xPUSCH, through DCI. According to allocation of the serving sell, the UE may transmit the information about the Tx beam ID that causes the biggest interference to the neighbor cell and the neighbor cell ID corresponding thereto through the xPUCCH resource and piggyback and transmit the information about the remaining Tx beam IDs causing interference and neighbor cell IDs corresponding thereto on the xPUSCH.

Figure 10:
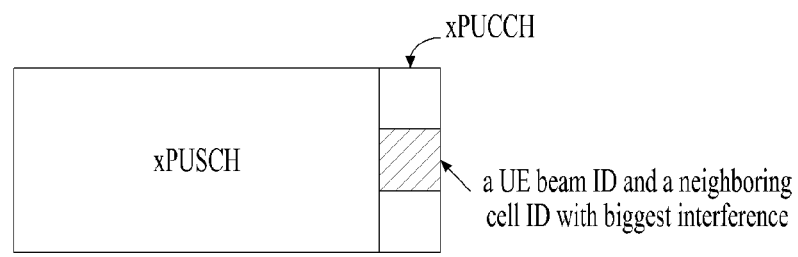
FIG. 10 illustrates a transmission position of information about a Tx beam ID that cause inter-cell interference and a related neighbor cell ID.

FIG. 10 illustrates a transmission position of information about a Tx beam ID causing inter-cell interference and a related neighbor cell ID.

Referring to FIG. 10, the serving BS may allocate only the information about a Tx beam ID that causes the biggest interference to a neighbor cell and a neighbor cell ID corresponding thereto to an xPUCCH resource such that the information will be transmitted through the xPUCCH resource. Particularly, the serving BS can indicate the position of a resource used for transmission in the xPUCCH through DCI.

The serving BS may receive information about a Tx beam ID causing inter-cell interference and a related neighbor cell ID from the UE and then trigger SRS transmission of the UE. Then, the UE may transmit SRS in beam directions corresponding to Tx beam IDs other than the reported Tx beam ID.

Specific Example (Embodiment 1-2) of Embodiment 1

The numbers of Tx beam IDs and related neighbor cell IDs piggybacking on the xPUSCH resource may be respectively limited to $M_{pusch}$ and $N_{pusch}$. Here, $M_{pusch}$ and $N_{pusch}$ are integers, $M_{pusch}$ is less than the total number of Tx beam IDs of the UE and $N_{pusch}$ is less than the total number of neighbor cell IDs of the UE.

Specific Example (Embodiment 1-3) of Embodiment 1

The numbers of Tx beam IDs and related neighbor cell IDs transmitted through the xPUCCH resource may be respectively limited to $M_{pucch}$ and $N_{pucch}$ in consideration of xPUCCH format. Here, $M_{pucch}$ and $N_{pucch}$ are integers, $M_{pucch}$ is less than the total number of Tx beam IDs of the UE and $N_{pucch}$ is less than the total number of neighbor cell IDs of the UE.

Embodiment 2

A new xPUCCH format including information about a UE Tx beam ID that needs to be transmitted to prevent inter-cell interference during SRS transmission of the UE and a related neighbor cell ID is proposed.

When there is one UE Tx beam ID and one related neighbor cell ID that need to be reported, (1) xPUCCH format $X_1$ configuration: SR+one UE Tx beam ID and related neighbor cell ID (2) xPUCCH format $X_2$ configuration: ACK/NACK+one UE Tx beam ID and related neighbor cell ID (3) xPUCCH format $X_3$ configuration: CSI+one UE Tx beam ID and related neighbor cell ID When there are multiple UE Tx beam IDs and related neighbor cell IDs that need to be reported, (1) xPUCCH format $X_4$ configuration: SR+$M_{pucch}$ UE Tx beam IDs and related neighbor cell IDs (2) xPUCCH format $X_5$ configuration: ACK/NACK+$M_{pucch}$ UE Tx beam IDs and related neighbor cell IDs (3) xPUCCH format $X_6$ configuration: CSI+$M_{pucch}$ UE Tx beam IDs and related neighbor cell IDs When there are multiple UE Tx beam IDs and related neighbor cell IDs that need to be reported (piggybacking), (1) xPUCCH format $X_7$ configuration: SR+$\alpha$ UE Tx beam IDs and related neighbor cell IDs (here, $\alpha \leq M_{pucch}$)

(2) xPUCCH format $X_8$ configuration: ACK/NACK+$\alpha$ UE Tx beam IDs and related neighbor cell IDs (here, $\alpha \leq M_{pucch}$)

(3) xPUCCH format $X_9$ configuration: CSI+$\alpha$ UE Tx beam IDs and related neighbor cell IDs (here, $\alpha \leq M_{pucch}$)

Embodiment 3

Figure 11:
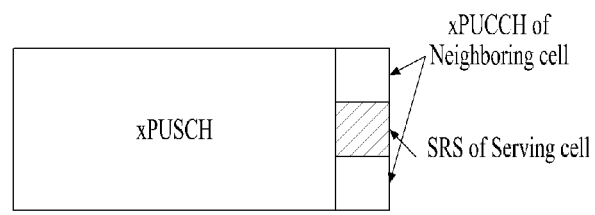
FIG. 11 illustrates UL scheduling between a serving cell and a neighbor cell.

FIG. 11 illustrates UL scheduling between a serving cell and a neighbor cell.

Referring to FIG. 11, the serving cell (or serving BS) may acquire neighbor cell information from a UE and then perform integrated scheduling with the neighbor cell. If an SRS is transmitted in a beam direction corresponding to a Tx beam ID of the UE, the serving cell may instruct the neighbor cell not to transmit an xPUCCH or an xPUSCH through a corresponding resource (i.e., a resource for the SRS of the serving cell illustrated in FIG. 11). As illustrated in FIG. 11, a resource for SRS of a serving cell and a resource for xPUCCH of a neighbor cell may be allocated using a frequency division multiplexing (FDM) method.

The serving cell may report a resource region with high interference to the neighbor cell and a BS of the neighbor cell may not allocate an SRS resource corresponding to Tx beam information of a related UE or may transmit another precoding matrix indicator (PMI) to the UE for the SRS.

In addition, the serving cell may allocate an SRS resource to avoid a region with strong interference and indicate another PMI to the UE.

Figure 12:
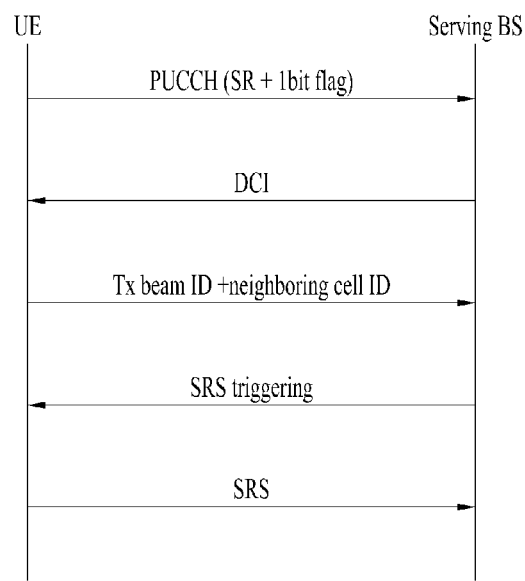
FIG. 12 illustrates a procedure between a serving BS and a UE for reducing inter-cell interference due to SRS transmission according to the present invention.

FIG. 12 illustrates a procedure between a serving BS and a UE to reduce inter-cell interference due to SRS transmission described in the present invention.

Referring to FIG. 12, the UE may transmit, to the serving BS, the aforementioned 1-bit flag along with an SR, ACK/NACK or channel state information (CSI) through a PUCCH or the like. When the flag is enabled, the serving BS may transmit, to the UE, information about the position of a resource for transmitting information about a Tx beam ID causing inter-cell interference due to SRS transmission of the UE and information about a neighbor cell ID through DCI. The UE may report, to the serving BS, the information about the Tx beam ID causing inter-cell interference due to SRS transmission of the UE and the related neighbor cell ID at the position of an xPUCCH or xPUSCH resource allocated through the DCI. Subsequently, when the serving BS triggers SRS transmission of the UE, the UE may transmit an SRS in beam directions corresponding to Tx beam IDs other than the reported Tx beam ID.

The present invention proposes reporting of a neighbor cell ID and a Tx beam ID of a UE, which strongly interferes between pre-recognized cells, to the serving cell during triggering of Tx beam tracking of the UE using an added flag or newly set xPUCCH. When the serving cell reports a resource region in which interference occurs to a related neighbor cell, the neighbor cell may not transmit an SRS using a corresponding Tx beam causing interference in the serving cell during SRS transmission of the UE in the neighbor cell or the serving cell may allocate an SRS resource for avoiding interference.

In addition, a method of performing related uplink scheduling in an integrated manner with the neighbor cell to reduce interference between different inter-cell uplink channels, in particular, interference between different inter-cell uplink channels from an SRS may be considered.

With regard to a problem in terms of interference in a neighboring cell due to SRS transmission for beam tracking of a UE, according to an exemplary embodiment of the present invention, a serving cell may perform uplink scheduling in an integrated manner with the neighbor cell to reduce inter-cell interference.

It will be appreciated by persons skilled in the art that that the effects that could be achieved with the present invention are not limited to what has been particularly described hereinabove and other advantages of the present invention have been more clearly understood from the above detailed description taken in conjunction with the accompanying drawings.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

The method for reducing inter-cell interference due to Tx beam tracking of a UE in a wireless communication system and a UE therefore are industrially applicable to various wireless communication systems such as 3GPP LTE/LTE-A and 5G communication systems.

What is claimed is:

1. A method for reducing inter-cell interference caused by transmission (Tx) beam tracking, by a user equipment (UE), in a wireless communication system, the method comprising:

transmitting, to a serving base station (BS) through a physical uplink control channel (PUCCH), an indicator including a request for reporting first information and second information, wherein the first information includes Tx beam identifiers (IDs) of the UE related to Tx beams causing interference to a neighbor cell by a sounding reference symbol (SRS) transmission of the UE, and wherein the second information includes a cell ID of the neighbor cell;

receiving, from the serving BS, downlink control information (DCI) related to a first resource to be used for transmission of the first information and the second information;

transmitting, to the serving BS, the first information and the second information using the first resource configured by the DCI; and transmitting, to the serving BS, an SRS using a second resource in a beam direction related to a Tx beam ID other than the Tx beam IDs included in the first information, wherein a third resource, different from the second resource, is used for transmitting an uplink signal to the neighbor cell, and wherein the second resource and the third resource are frequency division multiplexed (FDM).

2. The method according to claim 1, wherein the Tx beam IDs include a Tx beam ID related to a Tx beam causing the greatest interference to the neighbor cell.

3. The method according to claim 1, wherein a scheduling request (SR), an ACK/NACK signal, or channel state information is transmitted with the indicator on the PUCCH.

4. A user equipment (UE) for reducing inter-cell interference caused by Tx beam tracking in a wireless communication system, the UE comprising:
a transmitter;
a receiver; and
a processor, operatively coupled to the transmitter and the receiver,
wherein the processor is configured to:
control the transmitter to transmit, to a serving base station (BS) through a physical uplink control channel (PUCCH), an indicator including a request for reporting of first information and second information, wherein the first information includes Tx beam identifiers (IDS) related to Tx beams causing interference to a neighbor cell by a sounding reference symbol (SRS) transmission of the UE, and wherein the second information includes a cell ID of the neighbor cell;

control the receiver to receive, from the serving BS, downlink control information (DCI) related to a first resource to be used for transmission of the first information and the second information;

control the transmitter to transmit, to the serving BS, the first information and the second information using the first resource configured by the DCI; and control the transmitter to transmit, to the serving BS, an SRS using a second resource in a beam direction related to a Tx beam ID other than the Tx beam IDs included in the first information, wherein a third resource, different from the second resource, is used for transmitting an uplink signal to the neighbor cell, and wherein the second resource and the third resource are frequency division multiplexed (FDM).

5. The UE according to claim 4, wherein the beam IDs include a Tx beam ID related to a Tx beam causing the greatest interference to the neighbor cell.

6. The UE according to claim 4, wherein the processor is further configured to:
   control the transmitter to transmit a scheduling request (SR), an ACK/NACK signal or channel state information with the indicator on the PUCCH.

\* \* \* \* \*

UNITED STATES PATENT AND TRADEMARK OFFICE
CERTIFICATE OF CORRECTION

PATENT NO. : 10,506,566 B2  
APPLICATION NO. : 15/448166  
DATED : December 10, 2019  
INVENTOR(S) : Kukheon Choi Page 1 of 1

It is certified that error appears in the above-identified patent and that said Letters Patent is hereby corrected as shown below:

On the Title Page

Item (54) and in the Specification, Column 1, Line 1-4, please change "CAUSED BY TRANSMISSION BEAM TRACKING OF UE IN WIRELESS COMMUNICATION SYSTEM AND UE THEREFOR" to --METHOD FOR REDUCING INTER-CELL INTERFERENCE CAUSED BY TRANSMISSION BEAM TRACKING OF UE IN WIRELESS COMMUNICATION SYSTEM AND UE THEREFOR--.

Signed and Sealed this  
Twenty-fifth Day of February, 2020

Andrei Iancu  
*Director of the United States Patent and Trademark Office*